United States Patent
Matsuzaki et al.

(10) Patent No.: US 9,995,259 B2
(45) Date of Patent: Jun. 12, 2018

(54) EVAPORATED FUEL PROCESSING DEVICE

(71) Applicant: YACHIYO INDUSTRY CO., LTD., Sayama-shi, Saitama (JP)

(72) Inventors: Toru Matsuzaki, Tochigi (JP); Kazunari Nakaya, Tochigi (JP); Masato Shinozaki, Tochigi (JP); Masaru Sawano, Tochigi (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 0 days. days.

(21) Appl. No.: 14/904,980

(22) PCT Filed: Sep. 26, 2014

(86) PCT No.: PCT/JP2014/075577
§ 371 (c)(1),
(2) Date: Jan. 14, 2016

(87) PCT Pub. No.: WO2015/064253
PCT Pub. Date: May 7, 2015

(65) Prior Publication Data
US 2016/0153410 A1    Jun. 2, 2016

(30) Foreign Application Priority Data
Nov. 1, 2013   (JP) ................. 2013-228204

(51) Int. Cl.
*F02M 37/00*   (2006.01)
*F02M 25/08*   (2006.01)
*B60K 15/035*  (2006.01)

(52) U.S. Cl.
CPC ... *F02M 37/0076* (2013.01); *B60K 15/03519* (2013.01); *F02M 25/08* (2013.01)

(58) Field of Classification Search
CPC .... F02M 25/08; F02M 25/0836; F02M 37/00; F02M 37/0076; F02M 2025/0845;
(Continued)

(56) References Cited

U.S. PATENT DOCUMENTS 5,497,800 A * 3/1996 Ohashi ............ B60K 15/03519
                                                       123/519
5,687,756 A * 11/1997 VanNatta ......... B60K 15/03519
                                                       137/202
(Continued)

FOREIGN PATENT DOCUMENTS

JP       64-26535       2/1989
JP       09-072258      3/1997
(Continued)

OTHER PUBLICATIONS

International Search Report dated Dec. 9, 2014, Application No. PCT/JP2014/075577, English translation included.
(Continued)

*Primary Examiner* — John Kwon
*Assistant Examiner* — Johnny H Hoang
(74) *Attorney, Agent, or Firm* — Rankin, Hill & Clark LLP

(57) ABSTRACT

An evaporated fuel processing device includes a liquid level surface detection valve that detects a full-tank liquid level surface when refueling, and closes a canister communication hole; a fuel shutoff valve to close an evaporation hole when a liquid level surface becomes higher than the full-tank liquid level surface; and an outlet port communicating with a canister. A first communication path and a second communication path are formed in a folded back shape folded back at a first valve seat upper part in plan view. The first communication path enables communication between the first valve seat upper part and a second valve seat upper part, (Continued)

and the second communication path enables communication between the first valve seat upper part and the outlet port. This constitution reduces fuel liquid leakage from the outlet port.

4 Claims, 4 Drawing Sheets

(58) Field of Classification Search
CPC ......... Y10T 137/3093; Y10T 137/3099; Y10T 137/86332; B60K 15/035; B60K 15/03519
USPC .................................................. 123/516–521
See application file for complete search history.

(56) References Cited

U.S. PATENT DOCUMENTS

| | | | | |
|---|---|---|---|---|
| 5,711,339 | A * | 1/1998 | Kurihara | B60K 15/03519 123/198 D |
| 6,557,578 | B2 * | 5/2003 | Shimamura | B60K 15/03519 137/202 |
| 6,810,862 | B2 * | 11/2004 | Bergsma | B60K 15/03519 123/519 |
| 7,152,586 | B2 * | 12/2006 | Aoki | B60K 15/03519 123/516 |
| 7,207,347 | B2 * | 4/2007 | Olshanetsky | F16K 17/36 137/202 |

FOREIGN PATENT DOCUMENTS

| | | |
|---|---|---|
| JP | 2000-054918 | 2/2000 |
| JP | 2000-97120 | 4/2000 |
| JP | 2001-140717 | 5/2001 |
| JP | 2001-206082 | 7/2001 |
| JP | 2010-265858 | 11/2010 |
| JP | 2011-185239 | 9/2011 |

OTHER PUBLICATIONS

Korean Office Action dated Aug. 29, 2017, Application No. 10-2016-7004087, English translation included, 10 pages.

* cited by examiner

EVAPORATED FUEL PROCESSING DEVICE

TECHNICAL FIELD

The present invention relates to an evaporated fuel processing device for a fuel tank.

BACKGROUND ART

There is known an evaporated fuel processing device described in a patent literature 1 as a conventional example one to be attached to a fuel tank for an automobile or the like. FIGS. 3A, 3B schematically show the evaporated fuel processing device, and are a plan view, a side view, respectively. The evaporated fuel processing device 31 is provided with a liquid level surface detection valve 32 and a fuel shutoff valve 33. The liquid level surface detection valve 32 has a first float valve body 35 to close a canister communication hole 34 being a valve seat when fuel is poured into the tank to be in a state of full-tank. The symbol L1 (FIGS. 4A, 4B) shows a full-tank liquid level surface. The fuel shutoff valve 33 has a second float valve body 37 to close an evaporation hole 36 being a valve seat when, for example, the vehicle body is largely inclined, so that a liquid level surface comes to be a prescribed position higher than the full-tank liquid level surface L1. The evaporation hole 36 is located at a position higher than the canister communication hole 34.

The first float valve body 35 and the second float valve body 37 are housed in a housing 38 being a valve box to be attached to the fuel tank T. The housing 38 is provided with an outlet port 39 to be connected to a canister not shown. In an upper space in the housing 38, the canister communication hole 34 and the evaporation hole 36 communicate with each other through a communication path 40. As realized from FIG. 3A, the evaporated fuel processing device 31 has a construction that the fuel shutoff valve 33, the liquid level surface detection valve 32, and the outlet port 39 are arranged on a straight line in this order from an end side.

PRIOR ART LITERATURE

Patent Literature

Patent literature 1: Japanese Patent Laid-Open Publication No. 2001-140717

SUMMARY OF THE INVENTION

Problems to be Solved by the Invention

Because in the conventional evaporated fuel processing device 31, as described above, the fuel shutoff valve 33, the liquid level surface detection valve 32, and the outlet port 39 are arranged on a straight line, when the vehicle body is inclined, for example, at the time of parking on a slope, so that a liquid level surface (shown by the symbol L2) comes to be inclined relative to the housing 38 as shown in FIG. 4B, a phenomenon that the canister communication hole 34 being a valve seat and/or the outlet port 39 comes to be located below the liquid level surface L2 is easy to occur. At this time, if trouble occurs upon the closing function of the first float valve body 35 for the canister communication hole 34, the fuel liquid might ooze out from the canister communication hole 34 to leak out from the outlet port 39.

The followings (1), (2), and the like can be thought as methods of avoiding the leakage from the output port 39. (1) Lowering the position of the evaporation hole 36 than that of the canister communication hole 34; (2) Setting the position of the output port 39 high. However, the method (1) is substantially difficult upon considering the structure of the fuel shutoff valve 33 to be worked at a liquid level surface higher than the full-tank liquid level surface. Furthermore, in the method (2), the height of the housing 38 increases and the problem of the leakage through the canister communication hole 34 is still left, so the leaked fuel might be jumped toward the outlet port 39 by rolling of the vehicle body or the like, and then leak out.

The present invention is created to solve such problems, and it is an object of the present invention to provide an evaporated fuel processing device for a fuel tank capable of reducing the leakage of the fuel liquid.

Means for Solving the Problems

In order to solve the problems, the present invention provides an evaporated fuel processing device including: a liquid level surface detection valve to detect a full-tank liquid level surface when refueling, and to close a first valve seat; a fuel shutoff valve to close a second valve seat when a liquid level surface becomes higher than the full-tank liquid level surface; and an outlet port to communicate with a canister, wherein the device includes a housing which houses the liquid level surface detection valve and the fuel shutoff valve and has the outlet port formed in the housing, and wherein a first communication path and a second communication path are formed in a folded back shape folded back at a first valve seat upper part in plan view, the first communication path enabling communication between the first valve seat upper part and a second valve seat upper part, and the second communication path enabling communication between the first valve seat upper part and the outlet port.

According to the present invention, the first communication path and the second communication path are formed in a folded back shape folded back at the first valve seat upper part, so the liquid level surface detection valve, the fuel shutoff valve, and the outlet port are located from an end side in this order or in the order of the liquid level surface detection valve, the outlet port, the fuel shutoff valve. By the positioning relations, the outlet port can be located outside the fuel liquid even if the first valve seat is located in the fuel liquid. Therefore, the leakage of the fuel liquid from the outlet port can be reduced.

Furthermore, since the first communication path and the second communication path are formed in a folded back shape folded back at the first valve seat upper part, even if the fuel liquid leaks out from the second valve seat when the closing function of the second valve seat has trouble, the leaked fuel liquid can be dropped in the first valve seat upper part on the way, so that the liquid leakage from the outlet port can be prevented.

And furthermore, the next invention is characterized in that the first communication path and the second communication path are extended in a lateral direction at each position having the same height as each other.

Furthermore, the present invention further includes a narrow and small bypass flow passage to enable communication between the second valve seat upper part and the second communication path without passing through the first valve seat upper part.

According to this invention, even if the whole of the first valve seat upper part is located in the fuel liquid, and the first communication path and the second communication path do not communicate with each other, the evaporated fuel in the second valve seat upper part can be released from the outlet port through the bypass flow passage.

Effect of the Invention

The evaporated fuel processing device for a fuel tank according to the present invention can reduce the leakage of the fuel liquid.

MODE FOR CARRYING OUT THE INVENTION

Figure 1A:
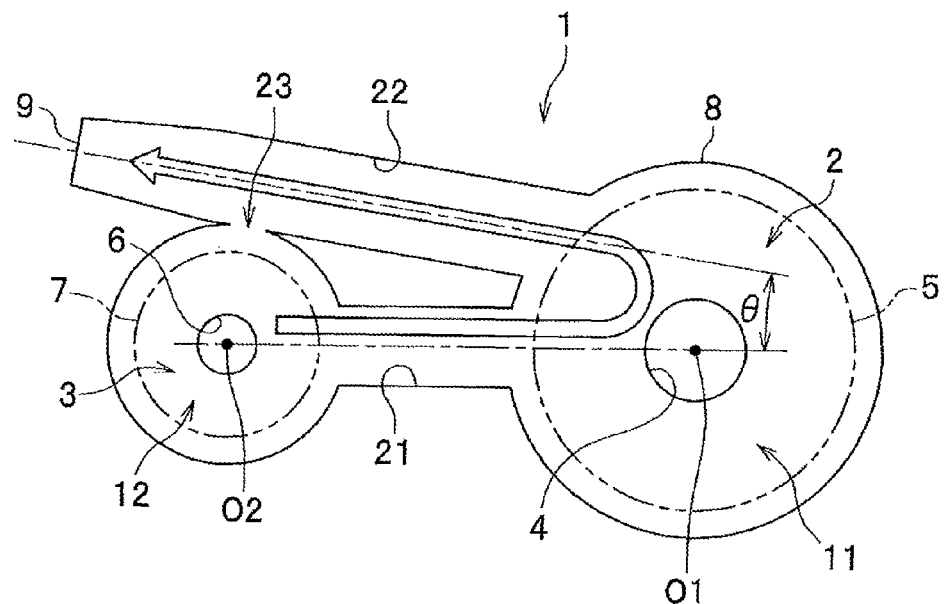
FIG. 1A is a plan view showing an evaporated fuel processing device according to the present invention.
Figure 1B:
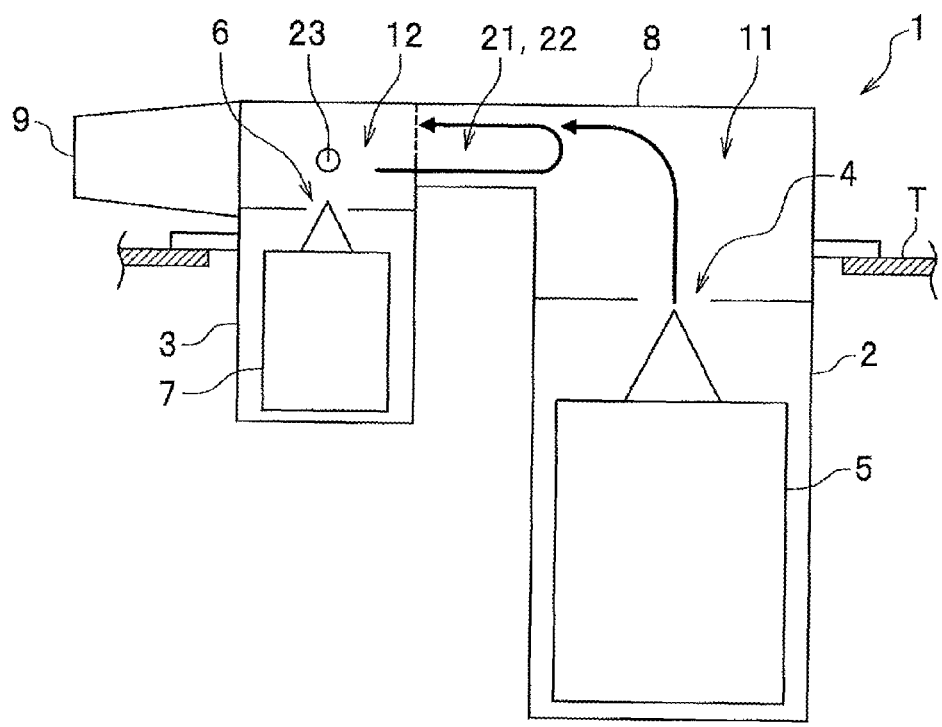
FIG. 1B is a side view showing the evaporated fuel processing device according to the present invention.
Figure 2A:
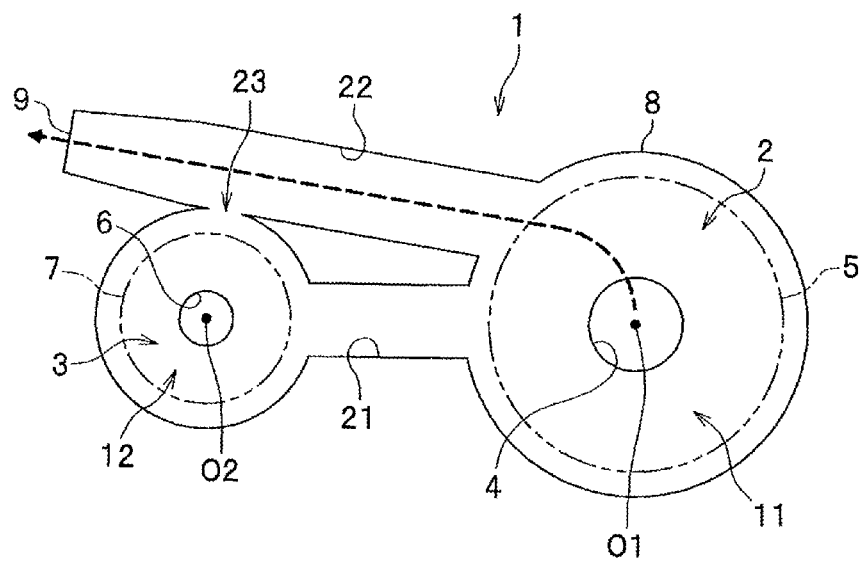
FIG. 2A is a plan view showing the evaporated fuel processing device according to the present invention when the fuel liquid level surface is inclined.

In FIGS. 1A and 1B, an evaporated fuel processing device 1 of the present embodiment includes a liquid level surface detection valve 2, a fuel shutoff valve 3, and a housing as a valve box. The liquid level surface detection valve 2 detects a full-tank liquid level surface when refueling, and has a first float valve body 5 to close a canister communication hole 4 being a first valve seat. Specifically, when the fuel liquid level surface rises up to a prescribed height when refueling, an opening (not shown) of the housing 8 is closed with the fuel, so that the flowing path to the outside of the tank is closed. Therefore, the pressure in the fuel tank T rises. Thereby, the fuel rises in the housing 8, so that the first float valve body 5 closes the canister communication hole 4. The pressure in the fuel tank further rises by closing the canister communication hole 4. And the fuel rises in the filler tube (not shown), and then reaches the sensor of the refueling nozzle, so that the refueling is automatically stopped. Then, difference of atmospheric pressure between the inside and the outside of the housing 8 gradually becomes small through an orifice (not shown) of the housing 8. According to this, the liquid level surface in the housing 8 lowers, so that the first float valve body 5 lowers. After several times of additional refueling, the fuel tank comes to be in a state of full-tank. The symbol L1 (FIGS. 2A and 2B) shows the liquid level surface in the state of full-tank.

The fuel shutoff valve 3 has a second float valve body 7 which closes an evaporation hole 6 being a second valve seat when a liquid level surface reaches a prescribed position higher than the liquid level surface L1 in the state of full-tank, for example, by largely inclining of the vehicle body. The evaporation hole 6 is located at a position higher than the canister communication hole 4. An outlet port 9 to be connected to a canister not shown is formed in the housing 8. The outlet port 9 is located at a position higher than the canister communication hole 4. And as an upper space in the housing 8, a first valve seat upper part 11 is defined above the canister communication hole 4, and a second valve seat upper part 12 is defined above the evaporation hole 6.

In plan view, a first communication path 21 and a second communication path 22 are formed in a folded back shape folded back at the first valve seat upper part 11. The first communication path 21 enables communication between the first valve seat upper part 11 and the second valve seat upper part 12. The second communication path 22 enables communication between the first valve seat upper part 11 and the outlet port 9. "The folded back shape" means that an intersection angle θ of a line segment (the length direction of the first communication path 21 in the present embodiment) connecting the axis O1 of the liquid level surface detection valve 2 and the axis O2 of the fuel shutoff valve 3 and the length direction of the second communication path 22 is zero (that is, the case where the first communication path 21 and the second communication path 22 are parallel with each other) or an acute angle. In a state where the first communication path 21 is viewed orthogonally from the side because of that relation, as shown in FIG. 1A, the liquid level surface detection valve 2, the fuel shutoff valve 3, and the outlet port 9 are located from an end side in this order, or in the order not shown of the liquid level surface detection valve 2, the outlet port 9, and the fuel shutoff valve 3 from an end side. It has been already described that conventionally, the fuel shutoff valve, the liquid level surface detection valve, and the outlet port were located in this order from an end side.

The evaporated fuel processing device 1 of the present embodiment includes a narrow and small bypass flow passage 23 enables communication between the second valve seat upper part 12 and the second communication path 22 without passing through the first valve seat upper part 11. "Narrow and small" means that the flow passage cross sectional area of the bypass flow passage 23 is smaller than those of the first communication path 21 and the second communication path 22. The bypass flow passage 23 is formed, for example, as a very small orifice hole, and performs a function that it allows the evaporated fuel to pass to the second communication path 22 from the second valve seat upper part 12, and cuts off the passing of the fuel liquid.

<Mode of Operation>

When the vehicle is in a normal state inclining not so much, both of the canister communication hole 4 and the evaporation hole 6 are in each open state as shown in FIG. 1. Therefore, the evaporated fuel which is generated in the fuel tank T and passes through the canister communication hole 4 flows to the canister through the second communication path 22 and the outlet port 9. As for the evaporated fuel which passes through the evaporation hole 6, the evaporated fuel flows to the canister via the outlet port 9 through the first communication path 21 and the second communication path 22, and, in this embodiment, in addition through the bypass flow passage 23.

Figure 2B:
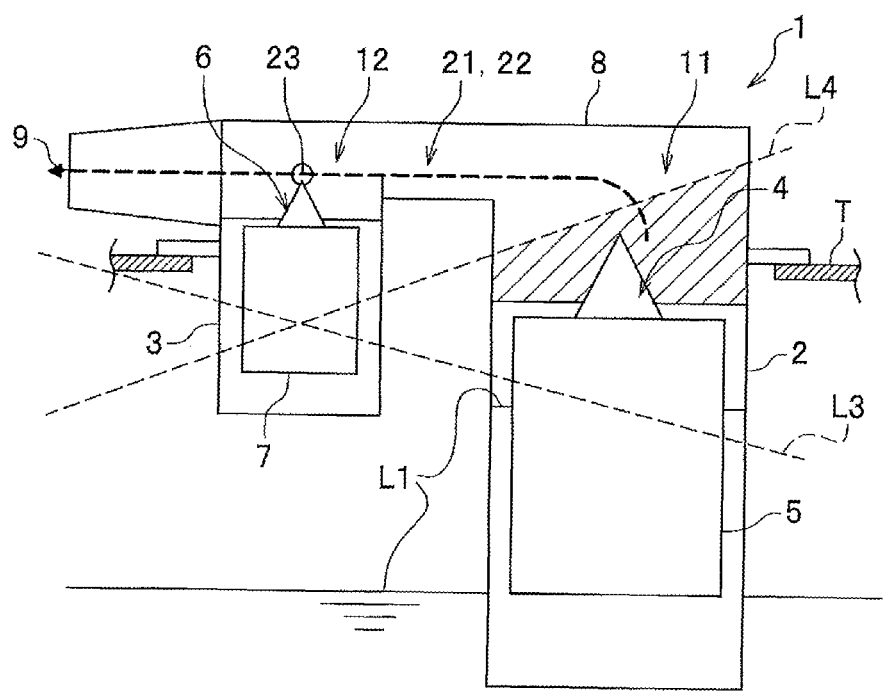
FIG. 2B is a side view showing the evaporated fuel processing device according to the present invention when the fuel liquid level surface is inclined.
Figure 3A:
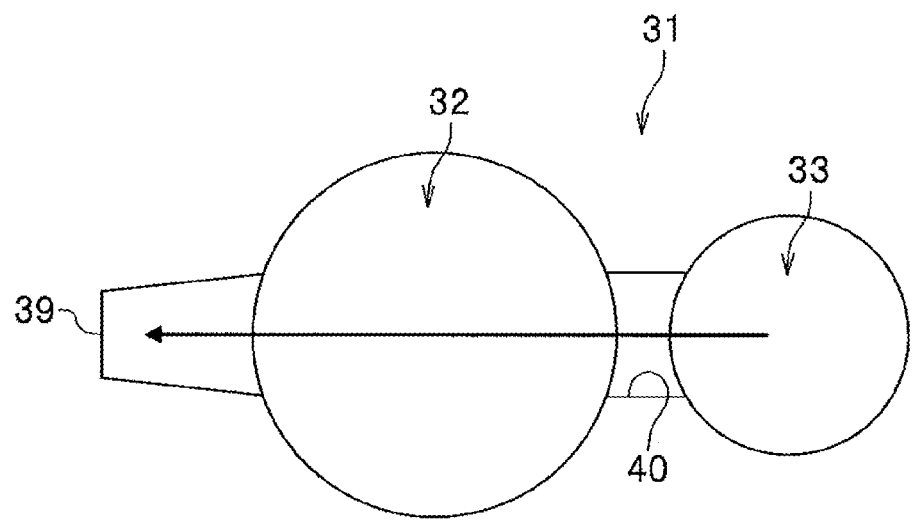
FIG. 3A is a plan view showing a conventional evaporated fuel processing device.
Figure 3B:
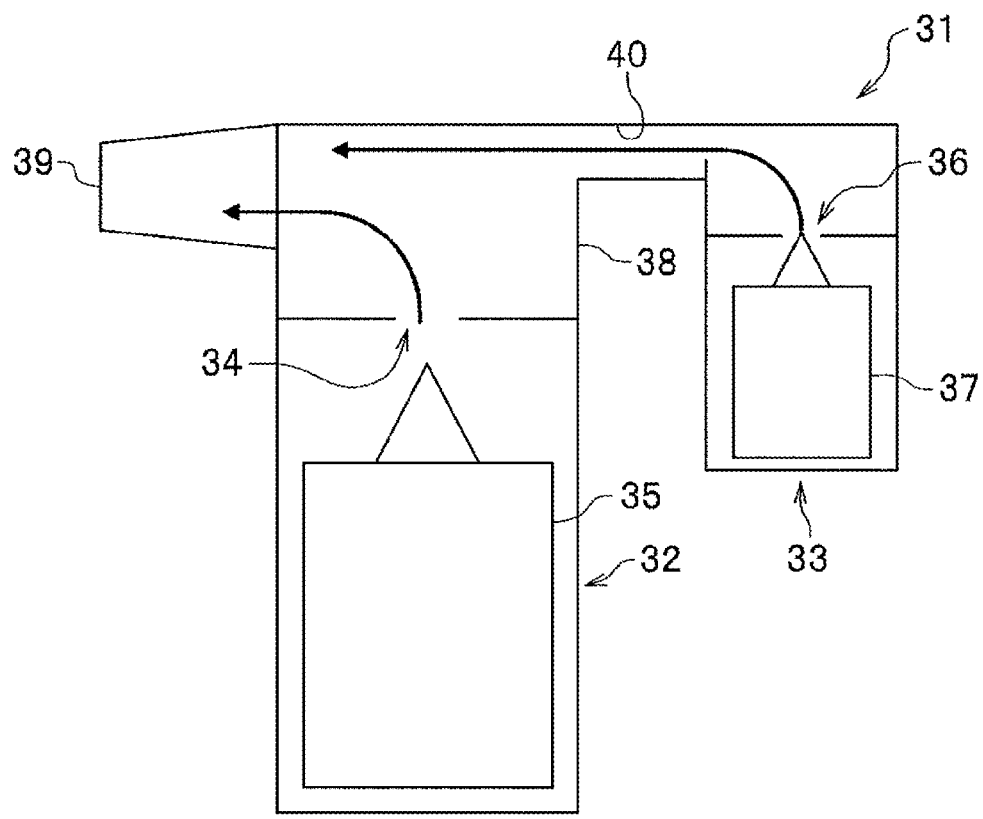
FIG. 3B is a side view showing the conventional evaporated fuel processing device.

Next, when the vehicle is in a state of a large inclination at the time of parking on a slope or the like, so that the outlet port 9 comes to approach the liquid level surface as shown in FIG. 2B (The liquid level surface at that time is shown by the symbol L3), the canister communication hole 4 and the evaporation hole 6 are closed in the liquid level surface detection valve 2 and the fuel shutoff valve 3, respectively. In this state, the canister communication hole 4 as well as the evaporation hole 6 is located above the liquid level surface L3, so that there is no problem that the canister communication hole 4 is located in the liquid. Note that, an intersection point of the liquid level surface L3 and a liquid level surface L4 is at a valve closing liquid level for the fuel shutoff valve 3.

Figure 4A:
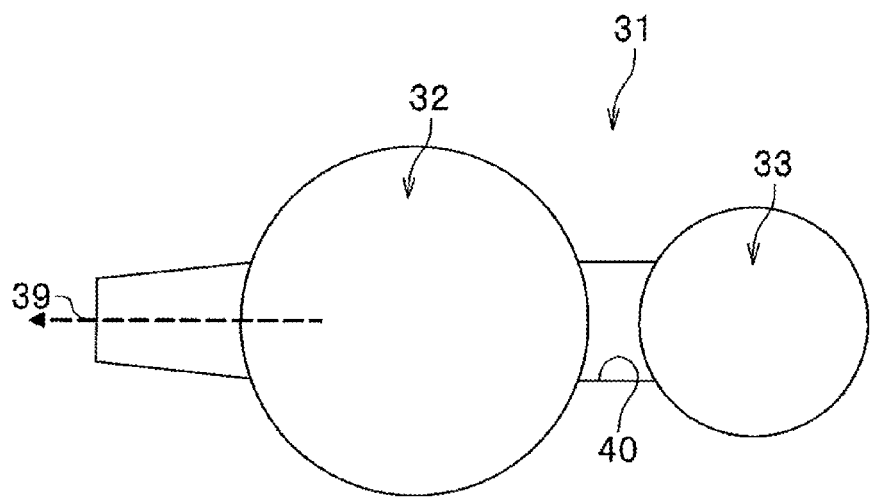
FIG. 4A is a plan view showing the conventional evaporated fuel processing device when the fuel liquid level surface is inclined.
Figure 4B:
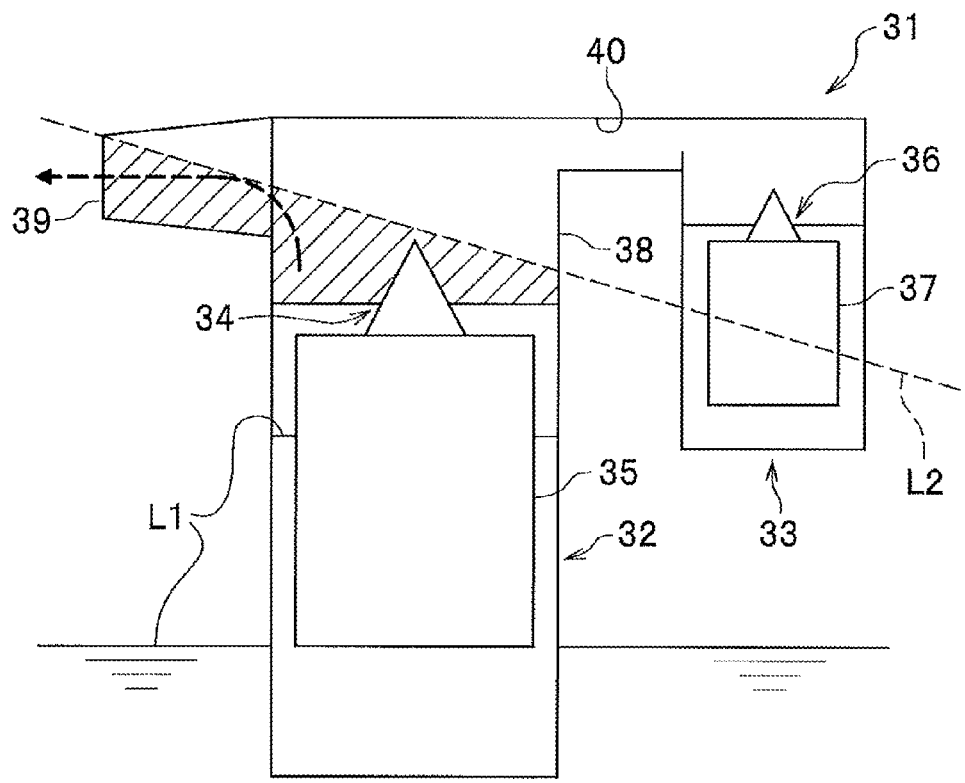
FIG. 4B is a side view showing the conventional evaporated fuel processing device when the fuel liquid level surface is inclined.

On the contrary, when the outlet port 9 comes to go away from the liquid level surface (The liquid level surface at that time is shown by the symbol L4), the canister communication hole 4 and the evaporation hole 6 are closed in the liquid level surface detection valve 2 and the fuel shutoff valve 3, respectively. In this state, since the canister communication hole 4 is configured to be located below the evaporation hole 6, the canister communication hole 4 is located in the liquid. And then, conventionally as shown in FIGS. 4A and 4B, since an outlet port 39 is located away from a fuel shutoff valve 33 more than a liquid level surface detection valve 32, when a canister communication hole 34 is located in the liquid under a liquid level surface L2, there has been a problem that the outlet port 39 is also easy to be located in the liquid even if the outlet port 39 is configured to be located at a position higher than the canister communication hole 34.

Whereas, in the present invention, since the first communication path 21 and the second communication path 22 are formed in the folded back shape folded back at the first valve seat upper part 11 as described in the foregoing, the liquid level surface detection valve 2, the fuel shutoff valve 3, and the outlet port 9 are located in this order from an end side, or in the order not shown of the liquid level surface detection valve 2, the outlet port 9, and the fuel shutoff valve 3 from an end side. That is, the outlet port 9 is located on the opposite side of the liquid level surface detection valve 2 on the basis of the fuel shutoff valve 3, or located at a position nearer to the fuel shutoff valve 3 than the liquid level surface detection valve 2. Thereby, as shown in FIG. 2B, the layout that the outlet port 9 is not located in the liquid under the liquid level surface L4 even if the canister communication hole 4 is located in the liquid under the liquid level surface L4, is enabled. Therefore, fuel liquid leakage from the outlet port 9 can be reduced.

Furthermore, since the first communication path 21 and the second communication path 22 are formed in the folded back shape folded back at the first valve seat upper part 11, the following effect is also brought about. If a trouble occurs about the valve closing function of the second float valve body 7 for the evaporation hole 6, there is a fear that the fuel liquid leaks through the evaporation hole 6. The position of the evaporation hole 6 is higher than that of the canister communication hole 4 and also near to the height position of the outlet port 9. Therefore, if the second valve seat upper part 12 is configured to directly communicate with the outlet port 9 without passing through the first valve seat upper part 11, the fuel liquid leaked through the evaporation hole 6 is easy to leak from the outlet port 9 just as it is. Whereas, in the case where the first communication path 21 and the second communication path 22 are formed in the folded back shape folded back at the first valve seat upper part 11, the fuel liquid leaked through the evaporation hole 6 can be dropped in the first valve seat upper part 11. Consequently, the outflow into the second communication path 22 folded back is reduced, so that the liquid leakage from the outlet port 9 can be prevented.

Furthermore, in this embodiment, the narrow and small bypass flow passage 23 is provided, which flow passage enables communication between the second valve seat upper part 12 and the second communication path 22 without passing through the first valve seat upper part 11. Therefore, even if the whole of the first valve seat upper part 11 comes to be located in the liquid, so that the first communication path 21 and the second communication path 22 do not come to communicate with each other, the evaporated fuel in the second valve seat upper part 12 can be released from the outlet port 9 through the bypass flow passage 23.

DESCRIPTION OF THE SYMBOLS

1 Evaporated fuel processing device
2 Liquid level surface detection valve
3 Fuel shutoff valve
4 Canister communication hole (first valve seat)
6 Evaporation hole (second valve seat)
8 Housing
9 Outlet port
11 First valve seat upper part
12 Second valve seat upper part
21 First communication path
22 Second communication path
23 Bypass flow passage

The invention claimed is:

1. An evaporated fuel processing device comprising:
a liquid level surface detection valve to detect a full-tank liquid level surface when refueling, and to close a first valve seat;
a fuel shutoff valve to close a second valve seat when a liquid level surface becomes higher than the full-tank liquid level surface; and
an outlet port to communicate with a canister,
wherein the device comprises a housing which houses the liquid level surface detection valve and the fuel shutoff valve and has the outlet port formed in the housing, and
wherein a first communication path and a second communication path, different from the first communication path, are formed in a folded back shape folded back at a first valve seat upper part inside the housing in plan view, the first communication path enabling communication between the first valve seat upper part and a second valve seat upper part, and the second communication path enabling communication between the first valve seat upper part and the outlet port, wherein the first communication path and the second communication path are arranged so that leaked liquid fuel leaked through the second valve seat is dropped in the first valve seat upper part.

2. The evaporated fuel processing device according to claim 1, wherein the first communication path and the second communication path are extended in a lateral direction at each position having the same height as each other.

3. The evaporated fuel processing device according to claim 1, further comprising a narrow and small bypass flow passage to enable communication between the second valve seat upper part and the second communication path without passing through the first valve seat upper part.

4. The evaporated fuel processing device according to claim 2, further comprising a narrow and small bypass flow passage to enable communication between the second valve seat upper part and the second communication path without passing through the first valve seat upper part.

* * * * *